(12) United States Patent
Huebler et al.

(10) Patent No.: US 6,947,912 B1
(45) Date of Patent: Sep. 20, 2005

(54) METHOD AND ARRANGEMENT FOR CONTROLLING A DYNAMIC SCALE

(75) Inventors: Uwe Huebler, Berlin (DE); Christoph Kunde, Berlin (DE)

(73) Assignee: Francotyp-Postalia AG & Co., Birkenweder (DE)

( * ) Notice: Subject to any disclaimer, the term of this patent is extended or adjusted under 35 U.S.C. 154(b) by 0 days.

(21) Appl. No.: 09/457,999

(22) Filed: Dec. 10, 1999

(30) Foreign Application Priority Data

Dec. 18, 1998 (DE) .................. 198 60 296

(51) Int. Cl.⁷ .......................................... G06F 17/60
(52) U.S. Cl. .................. 705/414; 177/121; 177/25.13; 177/84; 177/119
(58) Field of Search .................. 177/25.15, 145, 177/210 FP, 25.13, 4, 154, 50, 121, 84, 119; 705/407, 406, 410, 401, 403, 404, 408; 318/625; 714/48

(56) References Cited

U.S. PATENT DOCUMENTS

| | | | |
|---|---|---|---|
| 3,825,734 A * | 7/1974 | Jacobs et al. .......... 235/151.33 |
| 3,835,945 A * | 9/1974 | Yamanaka et al. .......... 177/134 |
| 3,863,725 A * | 2/1975 | Raynes .......... 177/52 |
| 3,890,492 A * | 6/1975 | Manduley et al. ..... 235/151.33 |
| 3,955,666 A * | 5/1976 | Braun et al. .......... 198/168 |
| 3,977,483 A * | 8/1976 | Greanias .......... 177/1 |
| 3,979,055 A * | 9/1976 | Fathauer et al. .......... 235/92 |
| 4,142,624 A * | 3/1979 | Diver et al. .......... 198/425 |
| 4,376,981 A * | 3/1983 | Check, Jr. et al. .......... 705/401 |
| 4,440,537 A * | 4/1984 | Blattermann et al. ....... 414/139 |
| 4,462,473 A * | 7/1984 | Valestin .......... 177/25.15 |
| 4,516,209 A * | 5/1985 | Scribner .......... 364/466 |
| 4,605,080 A * | 8/1986 | Lemelson .......... 177/4 |
| 4,631,021 A * | 12/1986 | Hayashi .......... 425/140 |
| 4,644,729 A * | 2/1987 | Fessler .......... 53/157 |
| 4,742,878 A   | 5/1988 | Freeman et al. |
| 4,903,788 A * | 2/1990 | Cordery et al. .......... 177/210 |
| 4,935,078 A * | 6/1990 | Bergman et al. .......... 156/64 |
| 4,956,782 A * | 9/1990 | Freeman et al. .......... 177/25.15 |
| 5,118,092 A * | 6/1992 | Yamada et al. .......... 271/275 |
| 5,226,496 A * | 7/1993 | Feinland et al. .......... 177/25.15 |
| 5,230,391 A * | 7/1993 | Murata et al. .......... 177/50 |
| 5,538,234 A * | 7/1996 | Yankloski .......... 271/11 |
| 5,586,037 A * | 12/1996 | Gil et al. .......... 705/407 |
| 5,684,275 A * | 11/1997 | Tolson .......... 177/119 |

(Continued)

FOREIGN PATENT DOCUMENTS

DE          3504511 A1 *   9/1986    .......... G01G 13/08

(Continued)

OTHER PUBLICATIONS

Herrle, Harald L., Dynamic Weighing: A Look at What In-Motion Weighing is All About (Reports on Checkweighing), Canadian Packaging, v47, n3, p24(1), 1994.*

*Primary Examiner*—Joseph Valenza
*Assistant Examiner*—Debra Charles
(74) *Attorney, Agent, or Firm*—Schiff Hardin LLP (57) ABSTRACT

In a method and arrangement for controlling a dynamic scale, the conveying speed of a conveyor belt for items of mail in the dynamic operating mode is independent of the format of the pieces of mail. During dynamic weighing, a controller of the scale deactivates the normal speed regulation for a DC motor and an unregulated pulsed voltage is applied to the DC motor. By an interaction of the motor with a tensioning device for a defined setting of the conveyor belt tension and due to a vibration-damped structure of the conveying arrangement of the scale, the conveying speed changes dependent on the weight of the piece of mail in a measuring time range.

28 Claims, 6 Drawing Sheets

U.S. PATENT DOCUMENTS

| | | | |
|---|---|---|---|
| 5,717,165 A * | 2/1998 | Cohen et al. | 177/2 |
| 5,754,361 A * | 5/1998 | Sakai et al. | 369/95 |
| 5,759,488 A * | 6/1998 | Eser et al. | 422/26 |
| 5,901,830 A * | 5/1999 | Kalm et al. | 198/370.06 |
| 6,035,291 A * | 3/2000 | Thiel | 705/408 |
| 6,052,201 A * | 4/2000 | Shibaki et al. | 358/1.16 |
| 6,265,675 B1 * | 7/2001 | Hubler et al. | 177/25.15 |

FOREIGN PATENT DOCUMENTS

| | | | | |
|---|---|---|---|---|
| DE | 3539913 A1 * | 5/1987 | | A21C 9/08 |
| EP | 0 372 726 | 6/1990 | | |
| EP | 000458974 A1 * | 6/1991 | | H02P 7/74 |
| EP | 0459555 B1 * | 8/1991 | | G01G 19/03 |
| GB | 2235656 A * | 3/1991 | | B65H 7/00 |

* cited by examiner

METHOD AND ARRANGEMENT FOR CONTROLLING A DYNAMIC SCALE

BACKGROUND OF THE INVENTION

1. Field of the Invention

The present invention is directed to a method and arrangement for controlling a dynamic scale which allow fast mixed mail processing in a franking system. The method is suitable for users of mail processing systems with a dynamic scale and postage-calculating postage meter machine, or with dynamic postage calculating scales and franking devices.

2. Description of the Prior Art

U.S. Pat. No. 4,956,782, British Specification 22 35 656 and European Application 514 107 disclose semi-dynamic weighing. Transport is interrupted, particularly given large postal matter that is difficult to weigh. The transport speed is reduced dependent on the dimensions of the letter.

For fast mail processing in a postage meter machine, U.S. Pat. No. 4,935,078 (corresponding to European Applications 615 212 and European Application 615 213) discloses a time control according to an operating mode selected for the user stations by the user. The user station arranged upstream can be a scale and the user station arranged downstream is the postage meter machine. A letter length is determined with sensors and the control of the user station arranged upstream and is transmitted to the postage meter machine. The latter controls the preceding, dynamic scale, so that the letter transport speed is reduced dependent on the letter length. A disadvantage is the reduced throughput for all long letters. Such scales require a modification of the control of the postage meter machine. There is the risk of letter jams given a high item input.

Known scales of the GFI Company are dynamic scales that require a reject compartment for incorrectly weighed letters. These incorrectly weighed letters are transported but are not franked. Incorrect weighing can occur because of an unstable environment and the fact the center of gravity of the letter, particularly given long letter formats, arrives too late on the scale, so that the weighing time is too short. These letters must then be separately weighed with a suitable, static scale. The corresponding postage must then be manually inserted into the franking unit. The automatic executive sequence is thus interrupted. Especially disadvantageous is the fact that the mail shipper cannot predict whether a specific letter that is placed together with the others as a stack will exceed these weight limits.

Given mixed mail, the probability is higher that the scale an incorrect weighing will occur. The throughput given mixed mail is reduced because either the speed is reduced or incorrectly weighed letters are rejected. Controllable motors and a complicated controller are required in order to be able to reduce the speed.

SUMMARY OF THE INVENTION

An object of the present invention is to provide an arrangement and a method for controlling a dynamic scale that overcome the aforementioned advantages of known devices. The dynamic scale should guarantee a high measuring precision over a broad weight measuring range even given high transport speed. The inventively controlled scale should be able to process mixed mail quickly on average given a simple control.

The above object is achieved in accordance with the principles of the present invention in a method and apparatus for controlling a dynamic scale for processing mixed postal matter having different sizes and thicknesses, wherein the scale is operated in a dynamic operating mode wherein, before a measuring time span, a piece of mail is supplied by a conveyor with a conveying speed at a predetermined, regulated value which is independent of the formal (size, thickness, etc.) of the piece of mail as the piece of mail enters into the scale, and wherein regulation of the conveying speed is deactivated while dynamic weighing takes place within the measuring time span, resulting in a weight measurement, and wherein regulation of the conveying speed is re-activated the piece of mail moves through a discharge region of the scale.

As experience has taught, the weighing precision is dependent on the oscillatory behavior of the scale, the pre-load, the mass moment of inertia, the stiffness and damping having the greatest influence. It has now been found that a defined reduction of the motor speed dependent on the weight of the piece of mail improves the measured results, even when no control of the reduction of the transport speed ensues. The structural length of the adaptor from the scale to the postage meter machine is advantageously minimized. It has also been found that the speed need not be diminished for every long letter for achieving a high item output as an aggregate; rather, it is sufficient when only the incorrectly weighed letters are weighed again. Given the pre-condition of a weighing pan having an adequate size for measuring, a control of the transport speed dependent on the format of the piece of mail can be omitted given mixed mail processing.

Inventively, the piece of mail is transported by the transport arrangement dependent on the weight in a dynamic operating mode without the motor speed being kept constant. The transport device has a tensioning mechanism for the conveyor belt that allows a setting of the slip between the drive and conveyor belt. A motor connected to the controller reduces its speed dependent on the weight of the piece of mail transported on the conveyor belt. The structure of the scale having a weighing pan and conveyor device allows a damped oscillatory behavior, particularly given a reduction of the motor speed, which improves the measured results given individual, heavy pieces of mail.

In dynamic scales, the heavy pieces of mail are automatically transported more slowly, thereby lengthening the available measuring time. The evaluation of the measurements ensues in the controller of the scale and requires a calculating time and a reaction time. The leading edge of the piece of mail leaves the weighing pan after the expiration of the measuring time. When, following the expiration of the measuring time, an algorithm for error recognition detects an error, the scale is automatically switched into a re-weighing mode by the controller. The largest format to be processed is taken into consideration for the selected dimensions of the weighing pan. The selected transport speed of the belt in the scale corresponds to the transport speed of the belt in the postage meter machine; however, the spacings from letter to letter that are set reduce the item output of the scale to approximately two-thirds of the maximum item output of the postage meter machine. It has been found that a re-measuring of the weight of pieces of mail is required only seldomly under these conditions.

DESCRIPTION OF THE PREFERRED EMBODIMENTS

Figure 1:
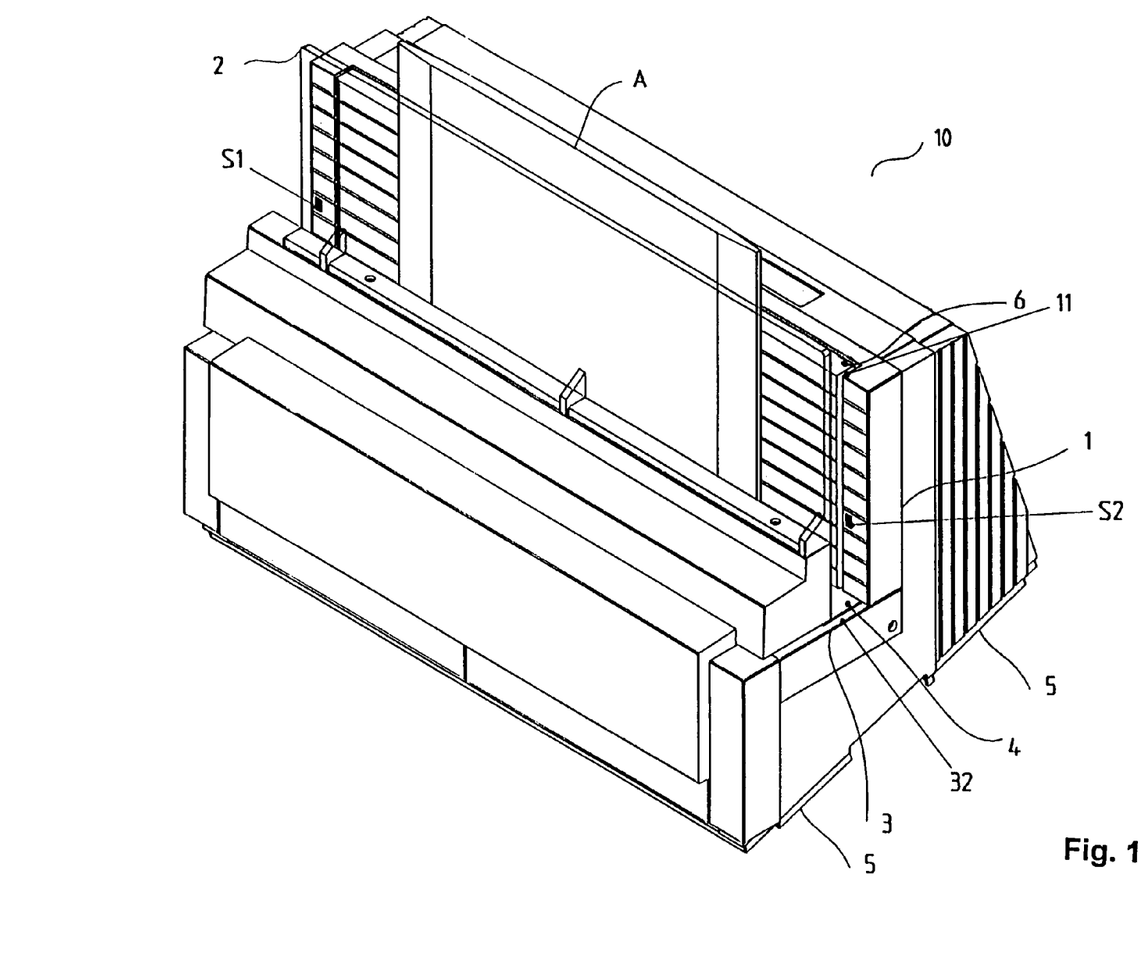
FIG. 1 is a perspective view of an inventive dynamic scale from the front right.

FIG. 1 shows a perspective view of a dynamic scale 10 that is fashioned for the transport of letters or, respectively, pieces of mail A standing on edge. The mail pieces A lie against a weighing pan 6 that is arranged in a recess 11 in a back guide wall 1 of the scale 10. Sensors S1 and S2 are arranged in the back guide wall 1 at both sides of the recess 11 for the weighing pan 6. A conveyor arrangement 4 with a conveyor belt that is deflected under the sensors S1 and S2 lies at the level of the lower guide wall 3 of the scale 10. The back guide wall 1 is inclined slightly toward the back of the scale 10, preferably by 18° beyond the perpendicular. This corresponds to an optimization angle already identified for an automatic letter feed and a postage meter machine (German PS 196 05 014 and German PS 196 05 015). The lower guide wall 3 is arranged orthogonally relative to the back of this scale 100 and, accordingly, also relative to the front cover plate 2. A defined letter attitude and a smooth adaptation to the preceding and following devices are thus achieved. The front cover plate 2 is composed, for example, of plexiglass. All of the assemblies or parts are secured on a chassis 5 via corresponding intermediate members. The weighing pan 6 has a back wall for guiding the pieces of mail A and the conveyor belt of the conveyor arrangement forms the bottom of the weighing pan 6. The weighing pan 6 is coupled to a weighing cell 7 at the approximate location of the center of gravity of the combination of the weighing pan 6 and a piece of mail A arranged on the weighing dish 6 having the highest allowed weight and the greatest allowed dimensions. The weighing pan 6 is implemented with a lightweight structure and is torsionally and flexurally stiff. The back wall of the weighing pan 6 is a one piece sandwich structure and has a central force transfer element with which the back wall is secured to a free end of the weighing cell 7. Further details regarding the structural format of the scale can be derived from German Patent Application P 198 33 767.1-53.

Figure 2A:
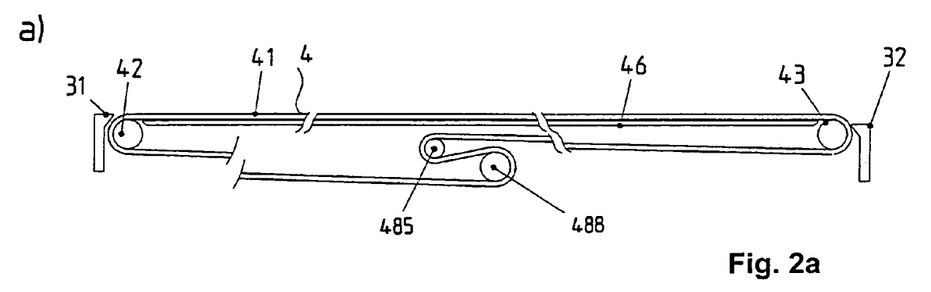
FIG. 2a is a schematic diagram of the conveyor arrangement in the inventive dynamic scale.

As shown in FIG. 2a, the front end 31 of the lower guide wall 3, which is in the admission region of the scale 10 is fashioned so that the piece of mail A stands approximately on edge on a conveyor belt 41. The upper side of the front end 31 of the lower guide wall 3 is preferably at the same level as the upper side of the conveyor belt 41. A back end 32, having the width of the conveyor belt 41, is arranged at the lower guide wall 3. This has a shorter length than the width of the conveyor belt 41 in order to minimize the conveying path to the postage meter machine (not shown) disposed following the scale 10. The back end 32 of the lower guide wall 3, fashioned as an adaptor to the postage meter machine, forms the output region of the scale so that the piece of mail A initially stands free while leaving the conveyor belt 41. The upper side of the back end 32 of the lower guide wall 3 is arranged below the level of the upper side of the conveyor belt 41 for this purpose. The back end 32 has the width of the conveyor belt 41 and, differing therefrom, is short in length in order to be able to transfer the letter over to the postage meter machine very quickly during a reaction time span T3 (described below).

The conveyor belt 41 is dimensioned with a width such that a piece of mail A having the largest allowed thickness, for example 20 mm, has enough space so that, when seated against the back wall of the weighing pan 6, it does not touch the front cover plate 2 of the scale. Falsifications of the measured result due to friction are thus avoided.

The conveyor arrangement 4 has front and back deflection rollers 42, 43 for the conveyor belt 41 and a drive roller 485 plus a tensioning roller 488. The conveyor belt 41 is non-elastically so that it does not stretch longitudinally. The drive roller 485 that drives the conveyor belt 41 is a sand-blasted aluminum pinion, that the conveyor belt 41 is composed of a low-stretch fabric having a glide coating of plastic, this coating facing against the aluminum pinion with a defined slippage due to the belt tension. In order to operate with only two deflection rollers 42, 43, and to be able to set the conveyor belt tension in a gentle way while still assuring a continuous and smooth flow of pieces of mail A, supports 46, 47 are also provided under the upper belt region carrying the letter load. The conveyor belt 41 slides along on a supporting plate 46 given a larger load, the surface thereof being smooth. The surface of the conveyor belt 41 facing toward the piece of mail A is preferably coated with a polyurethane foam adhesion layer.

Figure 2B:
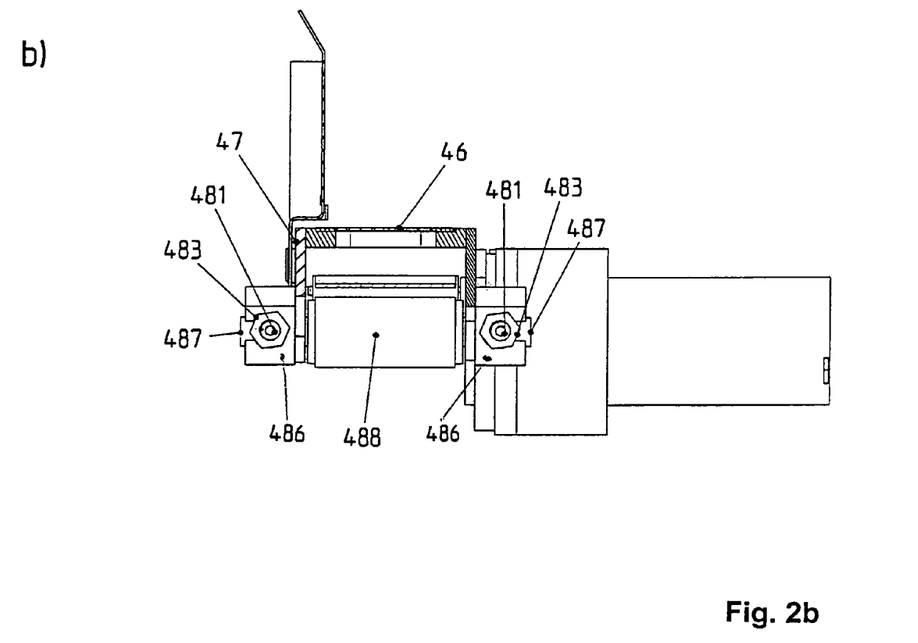
FIG. 2b is a side view of the tensioning device in the inventive dynamic scale.

FIG. 2b shows a side view of a tensioning arrangement 48 for tensioning the conveyor belt 41. This includes the tensioning roller 488, which is seated on a tensioning shaft 487 whose ends are drilled to receive respective guide pin 481 (only one of which can be seen in the side view of FIG. 2b). A covered helical spring is slipped onto each guide pin and a nut 483 is screwed thereon. The supporting plate 46 for the conveyor belt 41 is secured to respective carrying plates 47 (one of which can be seen) at both sides. A stop plate 48 is secured on each carrying plate 47 and is arranged between the nut 483 and the tensioning shaft 487.

Figure 3A:
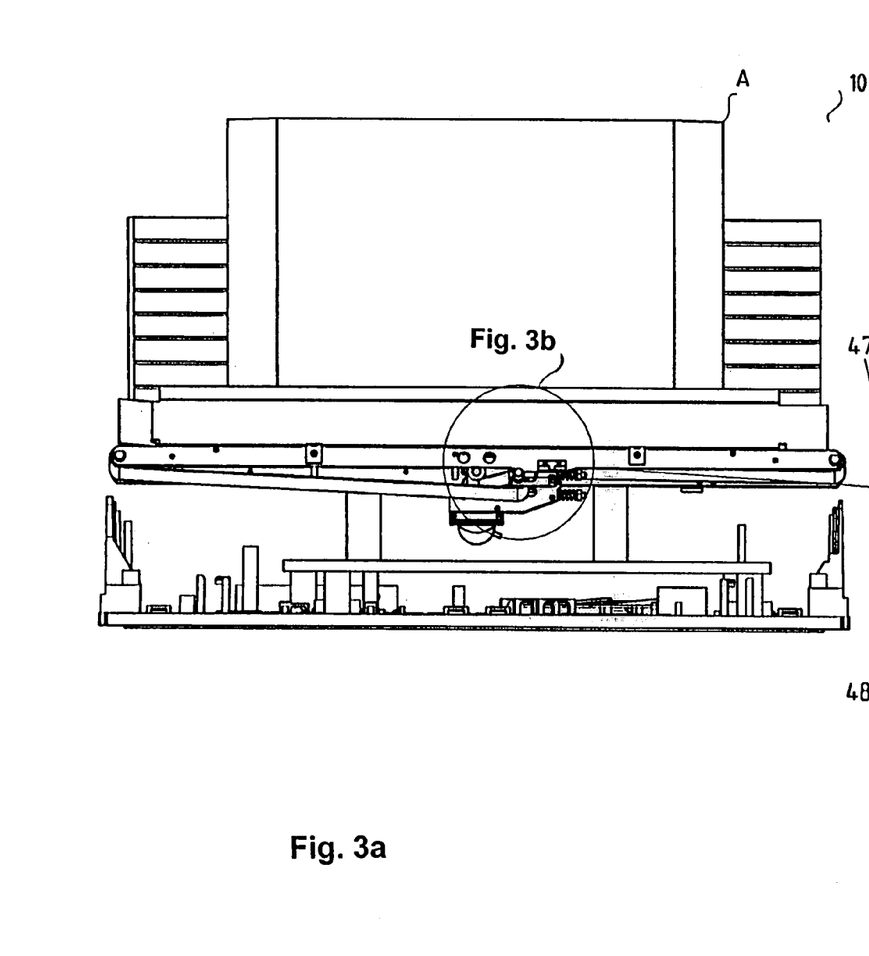
FIG. 3a is a perspective view of the conveyor arrangement from the right front with tensioning device, which is shown enlarged in FIG. 3b.

A scale 10 with the housing removed is shown in FIG. 3a, which reveals a perspective view of the conveyor arrangement 4 from the front right with the tensioning device 48. The tensioning roller 488 of the tensioning device 48 has its shaft 487 adjusted to such an extent opposite the belt transport direction and is biased by a spring 482 such that the conveyor belt 41 is stretched taut with a defined force in a predetermined way. A slippage is thereby pre-set for heavy letters. The carrying plates 47 and the supporting plate 46 can be fabricated of, for example, aluminum or some other lightweight but strong material and are secured to the weighing pan 6 so that a relatively rigid structure arises, this exhibiting a high characteristic frequency.

Figure 3B:
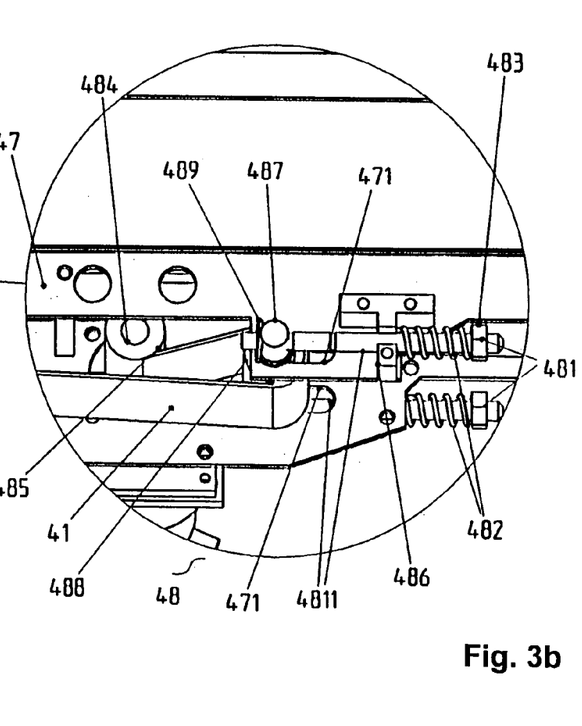

The tensioning device 48 is shown enlarged in FIG. 3b. A helical spring 482 is placed onto each guide pin 481 and is pre-stressed with a compressive force that is transmitted to the tensioning roller 488. Each of the two helical springs 482 lies against a nut 483 at one end and against the stop plate 486 at the other end. A bore (not shown) of the tensioning shaft 487 is fashioned such that the guide pins 481 each has an interlocking part 4811 seated to prevent rotation. A securing ring 489 at the end of the guide pin 481 prevents the guide pin 481 from sliding out of the bore of the tensioning shaft 487. The carrying plates 487 have oblong holes 471 at the height of the tensioning roller 488. When the conveyor belt 41 is pre-stressed with the tensioning roller 488, the tensioning shaft 487 thereof slides in an oblong hole 471 of the carrying plate 47 at both sides.

In an alternative embodiment of the tensioning device 48 (not shown), the belt tension is exerted by other, suitable elastic tensioning means. Such tensioning means are, for example, known tension springs or torsion springs.

Figure 4:
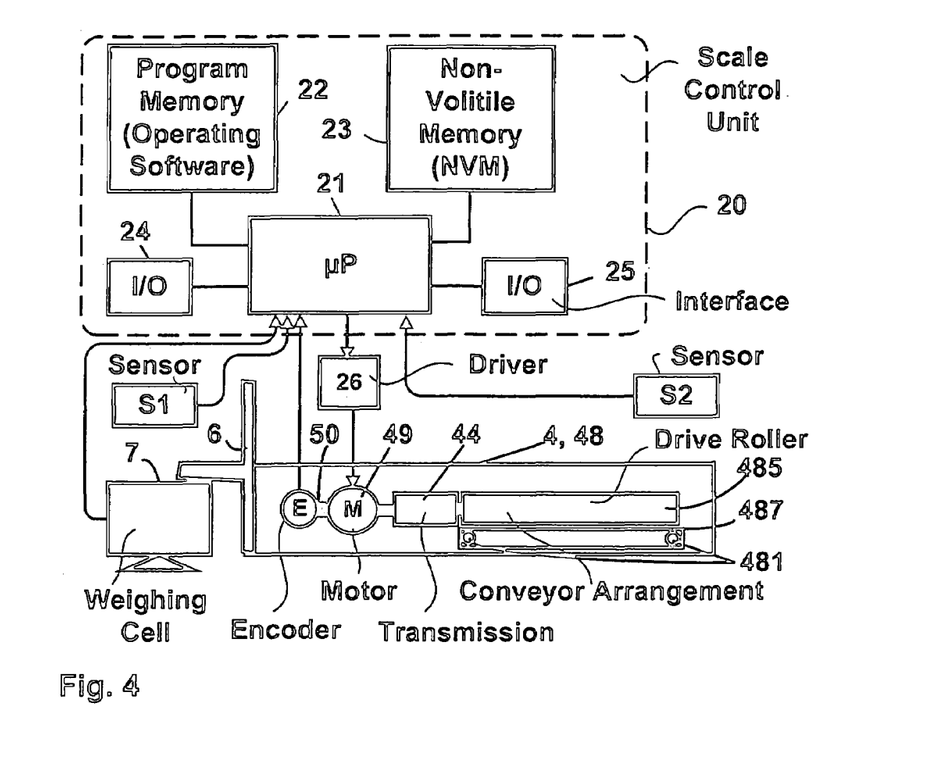
FIG. 4 is a block circuit diagram of the controller of the inventive dynamic scale.

FIG. 4 shows a block circuit diagram of the controller 20 of a dynamic scale 20 that has a microprocessor 21 that is connected to a program memory 22, to a non-volatile memory 23 as well as to an input interface 24 and an output interface 25. The microprocessor 21 is operationally connected to a motor 49 of the conveyor arrangement 4 of the scale via a driver 26, as well as to a speed sensor 50 and to sensors S1, S2 as well as to the weighing cell 7 in order to receive speed signals, sensor signals and weight data, from which control instructions are generated and forwarded to the conveyor arrangement 4. The conveyor arrangement 4 preferably includes a DC motor 49 that is supplied with DC pulses, whereby a specific speed is set on the basis of the ratio of pulse length to pulse pause. The M42×15 Gefeg-Antriebstechnik motor is suitable as such a DC motor 49, and an encoder 50 that is mechanically coupled to the motor 49 is suitable as the speed sensor 50.

In the operating mode for the dynamic operation of the scale 10, the conveyor arrangement 4 implements a forward motion of the piece of mail A within the scale 10 upstream location with a constant speed for lightweight letters. This speed does not exceed the transport speed in the preceding processing station. The motor 49 of the conveyor arrangement 4, given deactivated speed regulation, exhibits a resiliency in conjunction with the other components of the conveyor arrangement 4 at the weighing pan 6 shown in FIG. 3 that damps impacts and vibrations given heavy pieces of mail.

By utilizing a driver 26 that is switchable in terms of the polarity of the output pulses, connected between DC motor 49 and the controller 20, the conveyor arrangement 4 of the scale 10 has a switchable drive, allowing the conveying direction of the scale 10—given corresponding control—to be reversed in a second operating mode by reversing the poles of the pulsed voltage applied to the motor 49. The motor 49 is connected to the drive roller 485 via a suitable transmission 44. The transmission 44 can be a gear wheels or a belt.

In another embodiment the conveyor arrangement 4 of the scale 10 has a switchable drive operated directly by the control 20, the conveying direction of the scale being able to be reversed as a result thereof to allow a re-measurement in the second operating mode.

In an alternative embodiment, the conveyor arrangement 4 of the scale 10 has a switchable transmission, and the conveying direction of the scale 10 can be reversed in the second operating mode by switching the transmission dependent on the operating voltage applied to the motor.

The weighing cell 7 has wire strain gauges connected to an evaluation circuit that emits digital weight data to the microprocessor 21. The upstream sensor S1 serves as an entry sensor and the downstream sensor S2 serves as a discharge (exit) sensor. A known evaluation circuit is connected to the sensors S1 and S2, which emits digital signals to the microprocessor 21. For example, the sensors S1 and S2 can be fashioned as light barriers. The weighing cell 7 is preferably of the type HBM PW 26 of Hottinger Baldwin Messtechnik.

The dynamic scale can be operated in at least two automatically selectable operating modes, the selection of the operating modes ensuing within the dynamic scale 10 itself.

Figure 5:
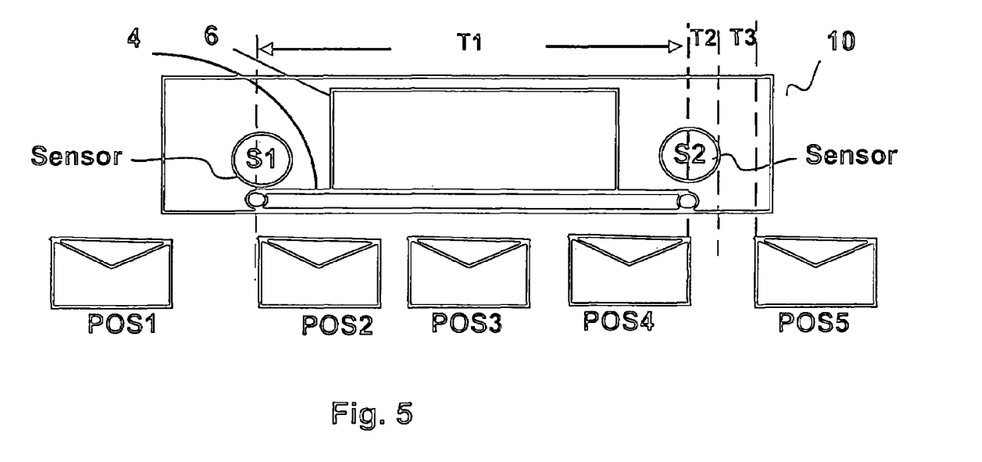
FIG. 5 illustrates letter positions in the letter stream relative to the weighing pan given dynamic weighing in the inventive dynamic scale.
Figure 6:
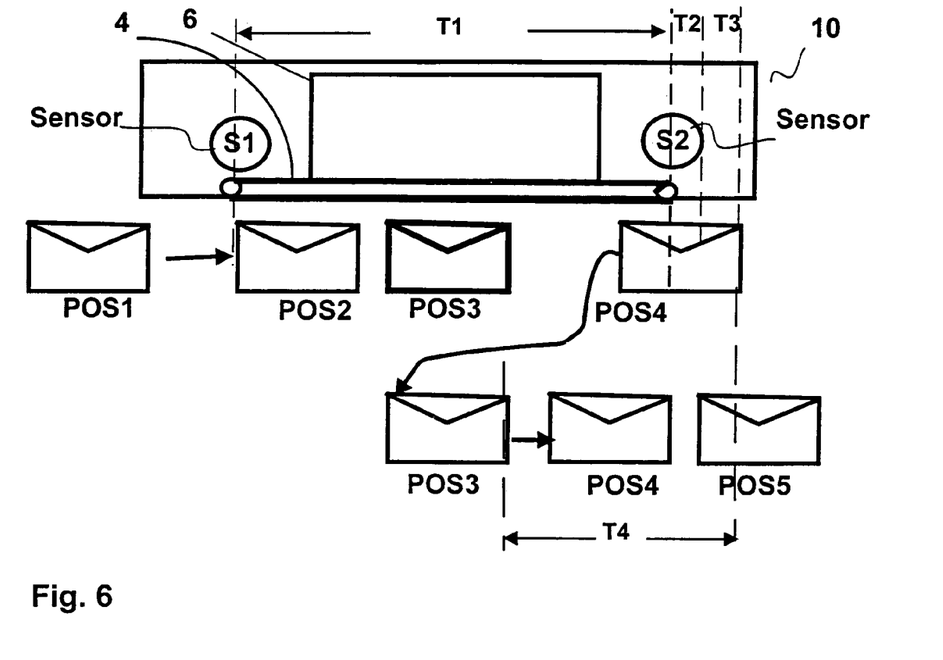
FIG. 6 illustrates letter positions in the letter stream relative to the weighing pan when switching to the re-weighing mode in the inventive dynamic scale.

Given fast dynamic weighing and franking, there is a risk that over-franking will be carried out in boundary situations (postage limits) given high letter weights. It has been found, however, that high letter weights occur only seldomly in a mixed stack of letters. The advantage of the second, user-selectable operating mode is that fewer operating time losses occur due to fewer stops (FIG. 5). The scale can automatically switch into a re-weighing mode from the second operating mode (FIG. 6).

The scale is switchable from a dynamic mode to a semi-dynamic operating mode. To that end, polarity of the pulses to the motor 49 of the conveyor arrangement 4 is reversed. Alternatively, a transmission can be switched when the scale 10 has determined an invalid measuring result. A reverse motion of the incorrectly measured letter is thus achieved within the scale. During the subsequent weighing, the scale 10 stops the conveyor belt 41 until the scale 10 has determined a correct measured result. The scale 10 thus subsequently operates in the static or semi-dynamic operating mode only for letters or other pieces of mail which have in fact been incorrectly weighed.

FIG. 5 shows an illustration of item positions in the stream of pieces of mail A relative to the weighing pan 6 given dynamic weighing. The explanation of the functioning of the controller 20 ensues on the basis of FIG. 5 and the following table:

Position: Action of the control

POS1: no action (mail piece A precedes the entry light barrier)

POS2: start measuring time interval, deactivate motor regulation

POS3: measuring phase (mail piece A lies completely on the weighing pan 6)

POS4: stop measuring time interval, determine and evaluate weight

POS5: signal readiness (mail piece A has left the weighing pan 6)

A mail piece A enters into the entry light barrier and activates the sensor S1. The sensors S1 and S2 lie outside the weighing region respectively and downstream next to the weighing pan 6. As a result of this design, the weighing pan 6 can be shortened by 6 through 10% in length. In particular, this enhances the item output given dynamic weighing of lightweight pieces of mail. The speed regulation for the motor 49 is still activated in the position POS1. The position POS2 illustrates the position of a mail piece A at the start of the measurement. A first measuring time span T1 begins with the weighing given deactivated motor speed regulation by components 21, 26, 29, 50. The trailing of the mail piece A edge in the admission region leaves the region of the sensor S1. The position POS3 illustrates the mail piece position in the measuring phase. Neither of the sensors S1, S2 is activated.

The position POS4 illustrates the position of a mail piece at the end of the measurement. The leading edge in the discharge region reaches the area of the sensor S2. The measuring time interval is ended given activation thereof. A second calculating time span T2 follows, wherein—in addition to evaluating the measurement—a check is also made to determine whether the weight of the piece of mail was correctly identified, so that the weight data can be forwarded downstream to the postage meter machine in a third reaction time span T3. The piece of mail A leaves the scale 10 in the position POS5. During the reaction time span T3 the center of gravity of the mail piece A is usually still within the weighing pan 6. If necessary, however, the letter can be conveyed back onto the weighing pan 6 by the switchable conveyor arrangement 4. The speed regulation for the motor 49 is re-activated outside the measuring time span T1.

FIG. 6 shows an illustration of mail piece positions in the item stream relative to the weighing pan 6 when switching to the re-weighing mode. The reaction time span T3 is long enough to allow switching into the re-weighing mode, including a braking time and safety margin time. The mail piece is conveyed upstream (time span T4) back into the position POS3, is then statically weighed in the position POS 3, and is then again conveyed via the position POS4 into the position POS5.

Figure 7:
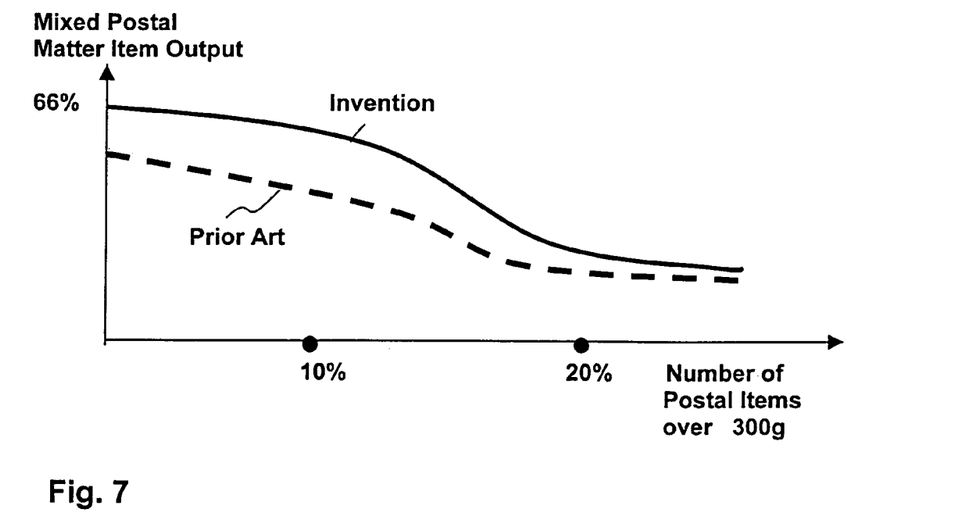
FIG. 7 illustrates the mixed mail item output dependent on the number of heavy pieces of mail in the inventive dynamic scale.

FIG. 7 shows a schematic illustration of the mixed mail item output dependent on the number of heavy pieces of mail in a stack of mail. Given heavy pieces of mail, the item output given dynamic operation of the scale 10 decreases due to the conveying speed that is reduced from the normal speed. Given a larger number of heavy pieces of mail in the stack of mixed mail, this reduction has a correspondingly greater effect. Nonetheless, the item output given mixed mail is higher compared to prior art devices because large items continue to be conveyed fast unless and until a false weight measurement is detected. This gain during dynamic weighing results from the shortening of the weighing pan 6. Given a stack without heavy pieces of mail, thus, the overall mixed mail item output already lies 6 through 10% higher.

Figure 8A:
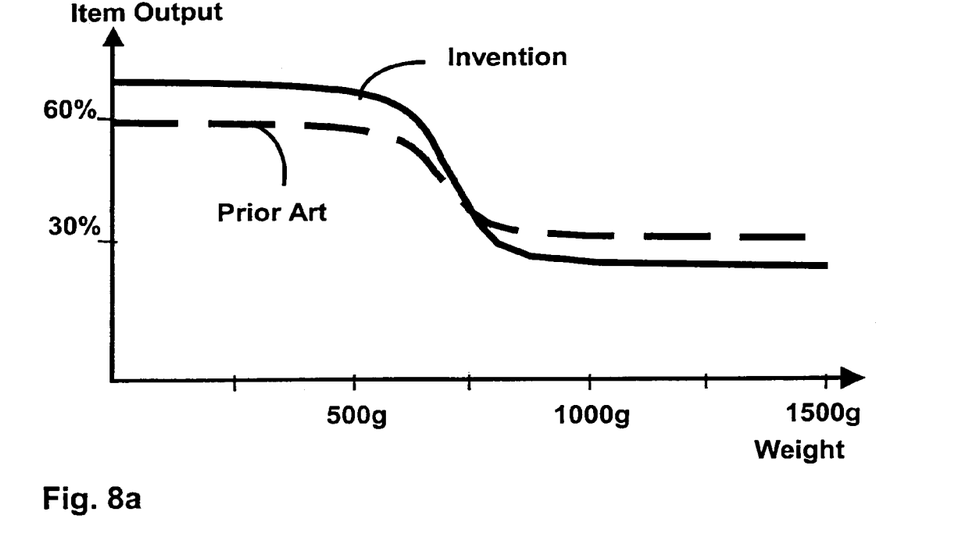
FIGS. 8a, 8b illustrate of the item output dependent on the weight of heavy pieces of mail in the inventive dynamic scale.
Figure 8B:
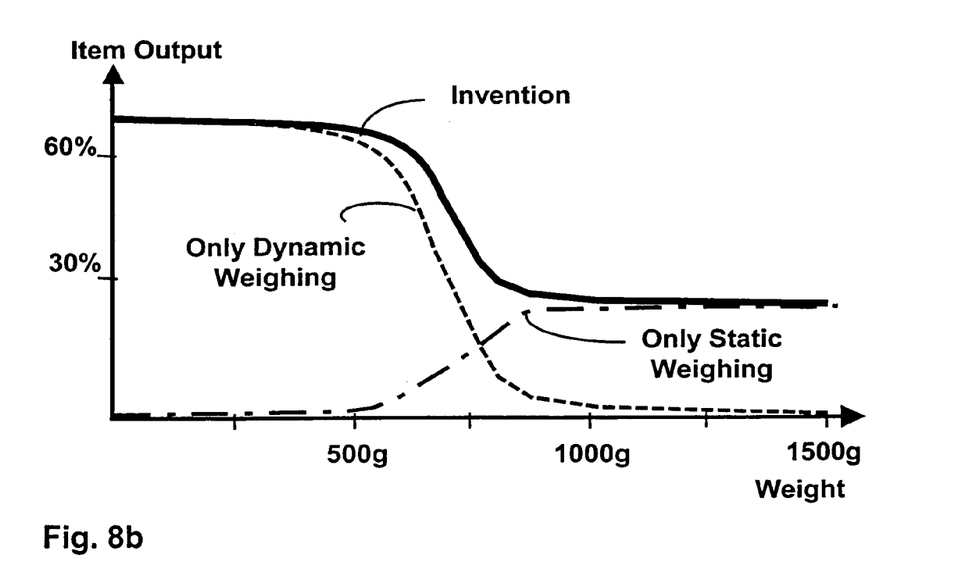

FIGS. 8a and 8b illustrate of the item output dependent on the weight of heavy pieces of mail. The customer can select between a number of user-selectable operating modes:

1. Weighing only once or not weighing and franking, leads to a item output up to 100% of that of a postage meter machine (not shown).
2. Slow and semi-dynamic weighing and franking, leads to a reduction of the item output up to 33% of that of a postage meter machine (prior art) or up to approximately 25% according to the invention (shown at the right in the diagram).
3. Dynamic weighing and franking, leads to an item output in the invention of up to approximately 66% of the item output of a postage meter machine, whereby the scale can switch to semi-dynamic weighing.

In the weight range up to 500 g, the item output advantageously lies higher than was hitherto capable of being achieved by prior art devices. The item output of a postage meter machine (100%), however, was not achieved because the spacings between items must be larger than when printing, since only one item is allowed to be located on the weighing dish pan 6 during weighing. Given an increase of the conveying speed when franking from approximately 68 cm/s to 100 cm/s, the item output rises only marginally because the weighing precision and the conveying speed practically possible during weighing behave inversely proportional relative to one another.

FIG. 8b shows the item output dependent on the weight of heavy pieces of mail. It has been found that the item output of a dynamic scale lies at approximately 66% (maximally 70%) of the item output of a postage meter machine, and that the item output of a semi-dynamic scale lies at approximately 20% through 25% of the item output of a postage meter machine. Dynamic measuring dominates in the weight range up to 500 g and the static measurement dominates in the weight range above 750 g, dominating the resulting item output, which proceeds from FIG. 8b. Given disturbances, the evaluation algorithm can already switch earlier to static weighing. On average, however, the rising curve that is shown occurs for switching to static weighing in the weight range from 500 g through 800 g. The required return transport for static weighing after stopping consumes a certain return transport time span T4. Differing from the scales operating statically or semi-dynamically that are known in the prior art, the resulting item output therefore turns out lower.

Given mixed mail processing, the clock output in the range up to 500 g decreases at the dynamic scale 10 dependent on the number of heavy pieces of mail, decreasing to approximately 40% of the item output of a postage meter machine (FIG. 7). When the number of large-format and heavy pieces of mail in the stack of mail is higher, the resulting item output approaches the item output given semi-dynamic operation, since the controller 20 initiates a re-measurement more frequently. The control of the dynamic scale 10, dependent on the evaluation of the weight measurement in the first operating mode, enables the transport of the piece of mail to the further processing station downstream or undertakes a switching into a second operating mode.

Inventively, the evaluation of the weighing results in the second operating mode proceeds with the goal of working exactly and speed-optimally at the same time, with the steps of determining that the weighed value could be imprecise within certain limits, conducting a plausibility check, emitting a plausible weight value to the postage meter machine or automatic switching into the semi-dynamic mode of the scale.

The scale 10 can be pre-set so that if the evaluation of the weight measurement in the first operating mode indicates that the measurement was probably imprecise, the control of the dynamic scale 10 undertakes switching into a further operating mode that initiates the transport of the piece of mail to the further processing station downstream with a plausible weight value being set instead of the actual weight value, the plausible weight value being higher than the actual (imprecise) weight value. A printing of postage that corresponds to the plausible weight value ensues with the postage meter machine, this being higher by an amount or factor than the identified, probably imprecise value. This switching only occurs when the actual weight value lies in the proximity of postage limits—the piece of mail would then be over-franked—or when the value detected as probably imprecise is grossly incorrect.

The procedure for detecting "probably imprecise" weight values is the subject matter of another patent application.

Although the control is simple, a preceding, manual setting or control is not required for reducing the conveying speed. Instead of the microprocessor, micro controllers or application-specific integrated circuits (ASICs) can be utilized.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for controlling a dynamic scale for processing mixed postal items having respectively different formats, said dynamic scale having a motor-driven conveyor for moving a postal item, in a dynamic operating mode, in succession with continuous movement through an entry region of the scale, a weighing pan, and a discharge region of the scale, said method comprising the steps of:

in said dynamic operating mode, supplying a piece of mail, having a weight, to said entry region of the scale at a predetermined regulated conveying speed which is independent of the format of the piece of mail, and conveying said piece of mail through said entry region of the scale to said weighing pan;

deactivating regulation of the conveying speed during a measuring time range while said postal item is conveyed without a stoppage through said weighing pan, so that said conveying speed is dependent on said weight of said item and with no controlled reduction of said conveying speed, and obtaining a weight measurement of said postal item, for allowing said weight measurement to be obtained in said dynamic operating mode with said postal item moving at a speed other than said predetermined regulated conveying speed; and after said measuring time span, re-activating regulation of the conveying speed and moving said postal item at said predetermined regulated conveying speed from said weighing pan through said discharge region of said scale.

2. A method as claimed in claim 1 comprising, in said dynamic operating mode, the steps of:

maintaining said conveying speed at said predetermined, regulated conveying speed before a beginning of said measuring time span;

sensing when said postal item is located in said entry region of the scale; and upon sensing that said postal item has exited said entry region of the scale, supplying unregulated voltage pulses to the motor driving said conveyor during said measuring time span to operate said conveyor with a predetermined power without regulation of said conveying speed, and tensioning said conveyor to reduce said conveying speed of said postal item during said measuring time span dependent on a weight of said postal item.

3. A method as claimed in claim 1 wherein said dynamic scale is used with a further processing station having a further processing station conveying speed, and regulating said conveying speed in said dynamic scale dependent on said further processing station conveying speed to produce an output of postal items from said dynamic scale which is approximately 66% of an output of postal items from said further processing station.

4. A method as claimed in claim 1 comprising the steps of:

evaluating said weight measurement of said postal item in said dynamic operating mode; and dependent on the evaluation of said weight measurement, directly transporting said postal item through said discharge region of said scale or switching into a further operating mode and statically weighing said postal item on said weighing pan in said further operating mode.

5. A method as claimed in claim 4 comprising the steps, in said further operating mode, of reversing a conveying direction of said conveyor for statically weighing said postal item; and subsequently again reversing the conveying speed of said conveyor after statically weighing said postal item to convey said postal item through said discharge region of said scale.

6. A method as claimed in claim 4 comprising, in said further operating mode, conveying said postal item at a constant conveying speed through said discharge region of said scale.

7. A method as claimed in claim 1 comprising the steps of:

evaluating said weight measurement of said postal item and identifying if said weight measurement is likely to be imprecise; and if said weight measurement is likely to be imprecise, switching into a further operating mode and conveying said postal item directly through said discharge region of said scale and assigning a weight value to said postal item in place of said weight measurement, said weight value being higher than said weight measurement which is likely to be imprecise.

8. A dynamic scale comprising:

a conveyor arrangement for conveying postal items, each having weight, having a conveyor belt driven by a motor;

a scale housing having an entry region for postal items and a discharge region for postal items;

a weighing pan connected to a weighing cell, said weighing pan being disposed between said entry region and said discharge region and said conveyor arrangement, in a dynamic operating mode, conveying a postal item with continuous movement without a stoppage in succession through said entry region, said weighing pan and said discharge region; and a controller for operating said motor for moving said belt at a predetermined, regulated conveying speed when a postal item enters said entry region, and for deactivating regulation of said conveying speed while said postal item is moving through said weighing pan, so that said conveying speed is dependent on said weight of said item and with no controlled reduction of said conveying speed, during a measuring time span during which a weight measurement of said postal item is made, for allowing said weight measurement to be made in said dynamic mode with said postal item moving at a speed other than said predetermined, regulated conveying speed, and, after said measuring time span, for re-activating regulation of said conveying speed for moving said postal item on said belt through said discharge region.

9. A dynamic scale as claimed in claim 8 wherein said weighing pan has a center of gravity, and wherein said weighing pan is mechanically connected to said weighing call substantially at said center of gravity.

10. A dynamic scale as claimed in claim 8 wherein said housing has a guide wall disposed below said conveyor bait, and wherein said housing comprises a support mechanism for supporting said conveyor belt above and close to said lower guide wall, and wherein said lower guide wall in said discharge region comprises an adapter for transferring a postal item from said discharge region to a downstream apparatus.

11. A dynamic scale as claimed in claim 8 wherein said motor has a switchable direction of operation for moving said conveyor belt in a forward conveying direction and in a reverse conveying direction, and further comprising a driver connected between said controller and said motor for switching said motor, dependent on a signal from said controller, to selectively move said conveyor belt in one of said first conveying direction and said second conveying direction.

12. A dynamic scale as claimed in claim 11 wherein said motor comprises a DC motor operated with a voltage having a polarity, and wherein said driver switches said polarity of said voltage to switch said motor to move said conveyor belt in said reverse conveying direction.

13. A dynamic scale as claimed in claim 11 comprising a switchable transmission, and wherein said controller switches said transmission to operate said motor to move said conveyor belt in said reverse conveying direction.

14. A dynamic scale as claimed in claim 8 comprising a support mechanism for said conveyor belt comprising two carrier plates and a supporting plate disposed between said two carrier plates, each of said carrying plates being connected to said weighing pan, and a tensioning arrangement for setting a tension of said conveyor belt, said tensioning arrangement being mounted to said carrier plates, and said conveyor belt being substantially non-elastic at least in a direction corresponding to a conveying direction of said postal item.

15. A dynamic scale as claimed in claim 14 wherein said tensioning arrangement comprises at least one adjustable tension spring for setting said tension.

16. A dynamic scale as claimed in claim 15 wherein said tensioning arrangement comprises a tensioning roller around which said conveyor belt is entrained, said tensioning roller being mounted on a tensioning shaft, said tensioning shaft having opposite ends each receiving a guide pin, respective helical springs wound around each guide pin, two stop plates respectively attached to said carrier plates, each guide pin having a nut screwed thereon and said stop plate being disposed between said nut and said tensioning shaft with each helical spring being compressed between one of said nuts and one of said stop plates, each helical spring being compressively pre-stressed.

17. A dynamic scale as claimed in claim 16 wherein said guide pins are respectively received in said tensioning shaft so as not to rotate within said tensioning shaft, and further comprising, for each guide pin, a securing ring which prevents the guide pin from sliding out of said tensioning shaft.

18. A dynamic scale as claimed in claim 16 wherein each of said carrier plates has an oblong hole therein, the respective oblong holes receiving said tensioning shaft and allowing said tensioning shaft to glide therein when said conveyor belt is tensioned by said tensioning roller.

19. A dynamic scale as claimed in claim 8 comprising a drive roller entrained by said conveyor belt and driven by said motor, said drive roller comprising a said-blasted aluminum pinion, and said conveyor belt being comprised of a low-stretch fabric having a glide coating facing said drive roller and allowing a predetermining slippage between said drive roller and said conveyor belt dependent on a belt tension of said conveyor belt.

20. A dynamic scale as claimed in claim 19 wherein said glide coating is comprised of plastic.

21. A dynamic scale as claimed in claim 8 wherein said housing has a lower guide wall having a width substantially equal to a width of said conveyor belt and having a length which is less than a length of a conveying path for postal items formed by said conveyor belt.

22. A dynamic scale as claimed in claim 8 wherein said weighing pan has a back wall for guiding a postal item, said conveyor belt forming a base of said weighing pan at an angle relative to said back wall.

23. A dynamic scale as claimed in claim 8 wherein said weighing pan is mechanically connected to said weighing cell substantially at a center of gravity of a combination of said weighing pan and a postal item, having highest permitted dimensions, when said postal item having highest permitted dimensions is disposed centrally on said weighing pan.

24. A dynamic scale as claimed in claim 8 wherein said weighing pan is comprised of flexurally and torsionally stiff lightweight material and has a back wall comprising a central force transfer element to said weighing cell.

25. A dynamic scale as claimed in claim 24 wherein said back wall of said weighing pan is comprised of a one-piece sandwich structure.

26. A dynamic scale as claimed in claim 8 further comprising a speed sensor mechanically connected to said motor and supplying a signal to said controller identifying a speed of said motor for use by said controller in regulating said conveying speed.

27. A dynamic scale as claimed in claim 26 wherein said speed sensor comprises an encoder.

28. A dynamic scale as claimed in claim 8 wherein said motor is a d.c. motor, and wherein said controller contains a regulation loop, including said d.c. motor, for regulating said conveying speed.

* * * * *